United States Patent [19]

Fraser et al.

[11] Patent Number: 5,257,624
[45] Date of Patent: Nov. 2, 1993

[54] GAIN CONTROL FOR ULTRASOUND SYSTEM

[75] Inventors: Carolyn E. Fraser, Reading; David M. Prater, Cambridge; Andreas M. Meyer, North Andover, all of Mass.

[73] Assignee: Hewlett-Packard Company, Palo Alto, Calif.

[21] Appl. No.: 782,691

[22] Filed: Oct. 25, 1991

[51] Int. Cl.$^5$ ............................................. A61B 8/00
[52] U.S. Cl. ............................ 128/660.01; 73/631
[58] Field of Search ......... 128/660.01, 660.04–660.07; 73/631

[56] References Cited

U.S. PATENT DOCUMENTS

| | | | |
|---|---|---|---|
| 4,043,181 | 8/1977 | Nigam | 73/631 X |
| 4,356,731 | 11/1982 | Mahony | 73/631 |
| 4,408,492 | 10/1983 | Kossoff et al. | 73/631 |
| 4,475,400 | 10/1984 | Flax | 73/631 |
| 4,512,350 | 4/1985 | Cimilluca | 128/660.07 |
| 5,063,931 | 11/1991 | Leavitt | 73/631 X |

FOREIGN PATENT DOCUMENTS 2146121A 4/1985 United Kingdom .......... 15/89

Primary Examiner—Francis Jaworski
Attorney, Agent, or Firm—Frank R. Perillo

[57] ABSTRACT

An operator adjusted lateral gain control (LGC) structure for an ultrasound imaging system, which may already include an operator adjusted time gain compensation (TGC) gain control structure. The LGC structure enables an operator to adjust the gain of one or more scan lines independently of the gain of at least one other scan line, said gain as a result of the LGC control being substantially constant along said one or more scan lines.

9 Claims, 4 Drawing Sheets

GAIN CONTROL FOR ULTRASOUND SYSTEM

BACKGROUND OF THE INVENTION

This invention relates to an operator adjustable gain control feature for controlling the gain of an ultrasonic scanning system as a function of the scanning angle of a received beam.

Existing ultrasonic scanning systems employ several techniques for controlling transmit or receive channel gains. At least some of these gains are operator adjustable to help present the desired image on the display screen. For example, the Hewlett-Packard SONOS 1000 ultrasound system incorporates an operator adjustable transmit gain control. Varying this control affects the intensity of the entire signal being displayed. Also well known is the Time Gain Compensation (TGC) function, which allows an operator to adjust the receive channel gain in discrete steps as a function of distance from the origin of the beam. The TGC control permits the adjustment of gain to compensate for the attenuation of the ultrasound signal as it propagates through the medium being scanned. Finally, it may be desirable to compensate for the non-uniform signal response of a transducer as a function of the angular position of this ultrasound beam. This is accomplished in a system such as the SONOS 1000 by storing in memory gain compensation values signals which adjust the receive gain at each position of the beam to compensate for this non-uniform response. A set of correction coefficients may be stored for each transducer of a particular type or frequency. These compensation values generally are not operator controllable.

SUMMARY OF THE INVENTION

It may be desirable to modify the gain, and hence the intensity of the displayed signal, as a function of the scan angle. This may be desired to enable the clinician to better analyze a particular region of a subject's anatomy, such as the motion of a wall of the heart. Such a gain adjustment, oriented along scan lines or within a range of scan angles, also may be desirable if the ultrasound signal is decreased in a particular region by shadowing, caused by anatomical structures such as the ribs or lungs of the subject being scanned, or where tissue fiber orientation of the subject results in displayed signals having unacceptable brightness. Finally, such an adjustment may be desirable in a system utilizing techniques for automatically detecting and highlighting such border regions as the interface between the wall and a chamber of the subject's heart. Absent such an adjustment, in regions where shadowing is present, there may not be sufficient signal for such automatic detection circuits to effectively function. The operation of such a detection circuit is more fully described in U.S. patent application Ser. No. 07/614,780 filed Nov. 9, 1990, and now U.S. Pat. No. 5,195,521 and assigned to the assignee of the present application.

If it is desired to increase the brightness of a particular subsector of a display, none of the above described techniques provides an acceptable solution. Increasing the transmitted power may result in unacceptable brightness or noise signals in other regions of the screen. Adjusting the TGC controls would modify the gain in a radial band, referenced to the origin of the displayed signal. This again may result in signals having unacceptable brightness in other regions of this radial band. Finally, the coefficients stored in the probe compensation circuitry would not be available to the operator to achieve the desired gain characteristics.

A principal object of the present invention is to provide a structure for permitting the system operator to vary the gain of the received signal as a function of the position of the beam. Such gain control is defined herein as Lateral Gain Control, or LGC.

The invention provides at least one operator adjustable LGC command for varying system gain as a function of the displacement of a particular scan line from a reference point, the gain along said scan line as a function of its distance from the system's transducer being substantially constant.

DETAILED DESCRIPTION OF THE PREFERRED EMBODIMENT

Figure 1:
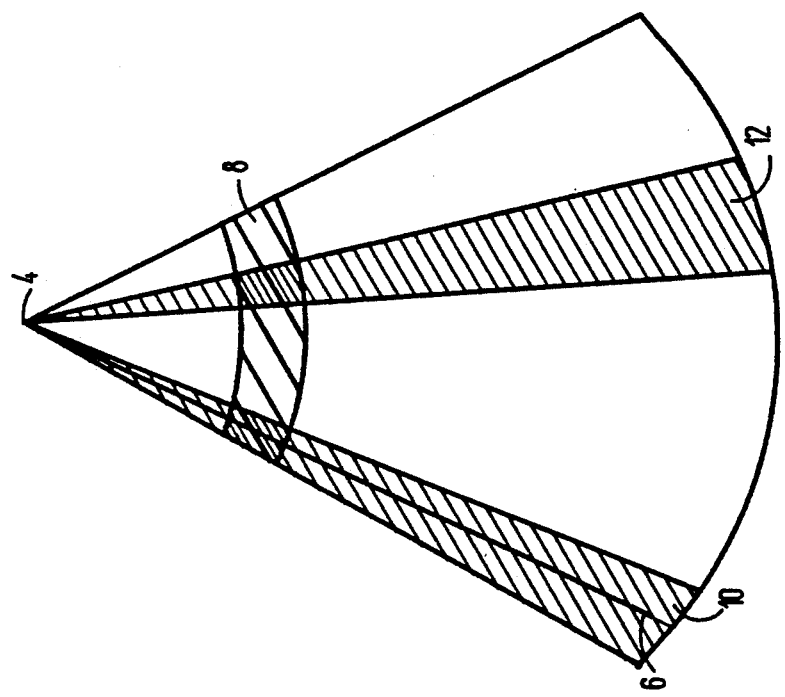
FIG. 1 illustrates the scanning format of the preferred embodiment, as well as the application of some of the gain control techniques discussed herein.

FIG. 1 illustrates the scan format and some of the terminology to be used in the discussion of the present invention. A scan sector format 2, which may be produced by an ultrasound scanning system used in cardiac examinations, is typically in the form of a wedge having a point of origin 4. Scan lines, such as 6, represent a transmitted and received signal at a particular angle, as measured with respect to a reference, such as one extremity of the scan region. These scan lines generally are not directly displayed, but are processed through the well known technique of scan conversion, which forms no part of the instant invention, and will not be discussed herein. Region 8 is an example of gain modification through Time Gain Compensation (TGC). Gain in region 8 may be varied by an operator in a band 8 as a function of its radial distance from origin 4. Region 10 is an example of gain modification in accordance with the principles of the instant invention. An operator may vary the gain in subsector 10, which may be a region having a predetermined angular size. This gain control, defined herein as Lateral Gain Control (LGC) is, unlike TGC, constant as a function of its radial distance from origin 4. It may also be constant within the subsector 10. Subsector 12 is another example of where LGC may be used. It should be appreciated that the entire main sector 2 may be subdivided into a predetermined number of subsectors, not illustrated, with each subsector having an associated LGC function.

This invention, in the preferred embodiment, is used in conjunction with a system that is similar to that described in U.S. Pat. No. 4,140,022, which patent is hereby incorporated by reference. Included in the system described in the '022 patent is a variable gain amplifier 26, and a gain control function 94. Function 94 is controlled by ROM 96.

Figure 2:
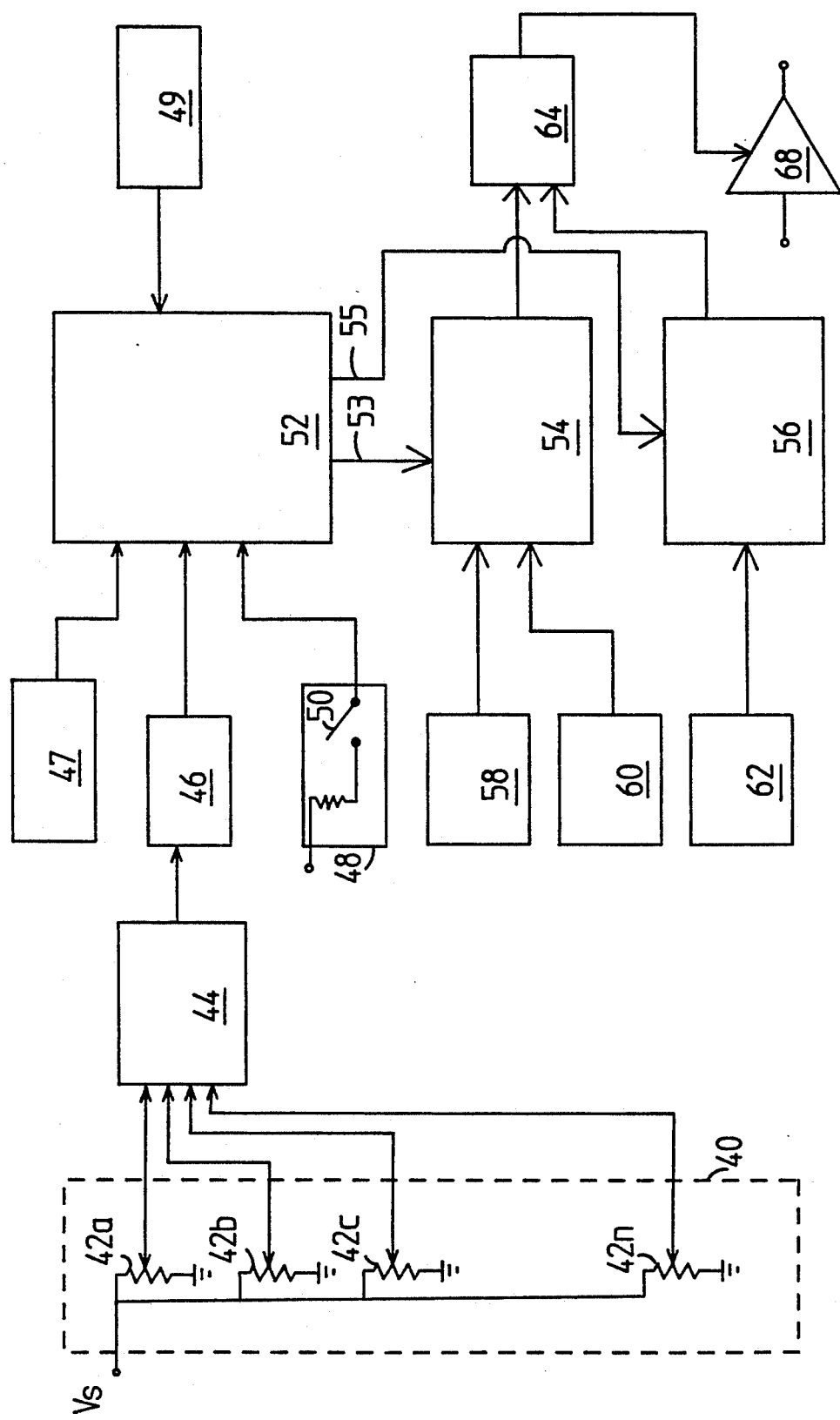
FIG. 2 is a block and schematic diagram showing the preferred embodiment of the invention.

FIG. 2 is a combined block and schematic diagram of a preferred embodiment of the invention. Box 40 represents a user interface, by which an operator may select LGC gain values for each subsector where lateral gain control is desired. The use of operator adjustable potentiometers 42a-42n is shown. These potentiometers may be of the linear, as opposed to rotary, type, such as the potentiometers used to control the TGC gain profile on systems such as the SONOS 1000. If the sector screen 2 is to be divided into n subsectors, then n potentiometers would be used. In the preferred embodiment, n equals 8. The analog control voltages generated by elements 42a-42n are converted to digital format by Analog Multiplixer 44 and Analog to Digital Converter 46. This digital signal is applied to Host Processor 52. While 52 may be a dedicated processor, in the preferred embodiment, this processing function is implemented through the use of multiple processors, which are also used to control other system functions, such as beam formation. Also supplied to processor 52 is an LGC Enable command 48, which may take the form of off/on switch 50.

An additional input to processor 52 is the output of TGC generator 49, which provides a TGC identification and value, and which may be implemented using structure similar to that used to generate the LGC commands. Also supplied to processor 52 is the output of Transducer Identification generator 47 which provides information regarding the type of transducer being used.

When the LGC controls are enabled, processor 52 will generate an LGC gain value for each scan line, which corresponds to the control signals selected by an operator via user interface 40. The LGC profile may be generated by retrieving precalculated values entered in internal memory of processor 52 or it may be calculated as needed. In the preferred embodiment, the second approach is used.

The LGC profile data is read into Line Gain RAM 54 via Data Line 53. Although it does not form part of the present invention, Line 53 also contains gain information related to the earlier mentioned compensation for transducer gain variations. This transducer gain compensation is stored in memory and retrieved in response to a command (not shown) related to the transducer type or its operating frequency. Thus, for a given scan line, the data stored in RAM 54 represents the sum of the LGC signal, and the probe compensation signal.

Processor 52 may also be used to generate a TGC gain profile corresponding to the position of a plurality of operator selected controls (not shown). This TGC gain profile is read into RAM 56 via Data Line 55.

Data is retrieved from RAM 54 and applied to Adder 64 in response to information regarding the particular scan line being generated, which is provided by Line Counter 58, and the line type, (e.g., Doppler, Color Flow, 2-D Imaging) as indicated by Line Type Counter 60.

In the preferred embodiment, also applied to Adder 64 is information related to the TGC gain profile. Data is retrieved from RAM 56 in response to Depth (as measured with respect to Origin 4) information provided by Depth Counter 62.

The combined output signal of Adder 64 is supplied via Data Line 65 to Variable Gain Amplifier 68. (This Amplifier 68 may correspond to Amplifier 26 of the '022 patent.) Depending on the nature of Amplifier 68, the signal contained on Line 65 may remain in digital form, or if an analog control signal is required, Adder 64 may include a Digital to Analog Converter.

Any change to the settings of potentiometers 42a-42n will result in new data being generated by processor 52, and supplied via Data Line 53 to RAM 54, which in turn updates the data stored in 54. If the LGC control 48 is not enabled, then the data contained in Data Line 53 will only relate to Transducers Probe Configuration.

Figure 3:
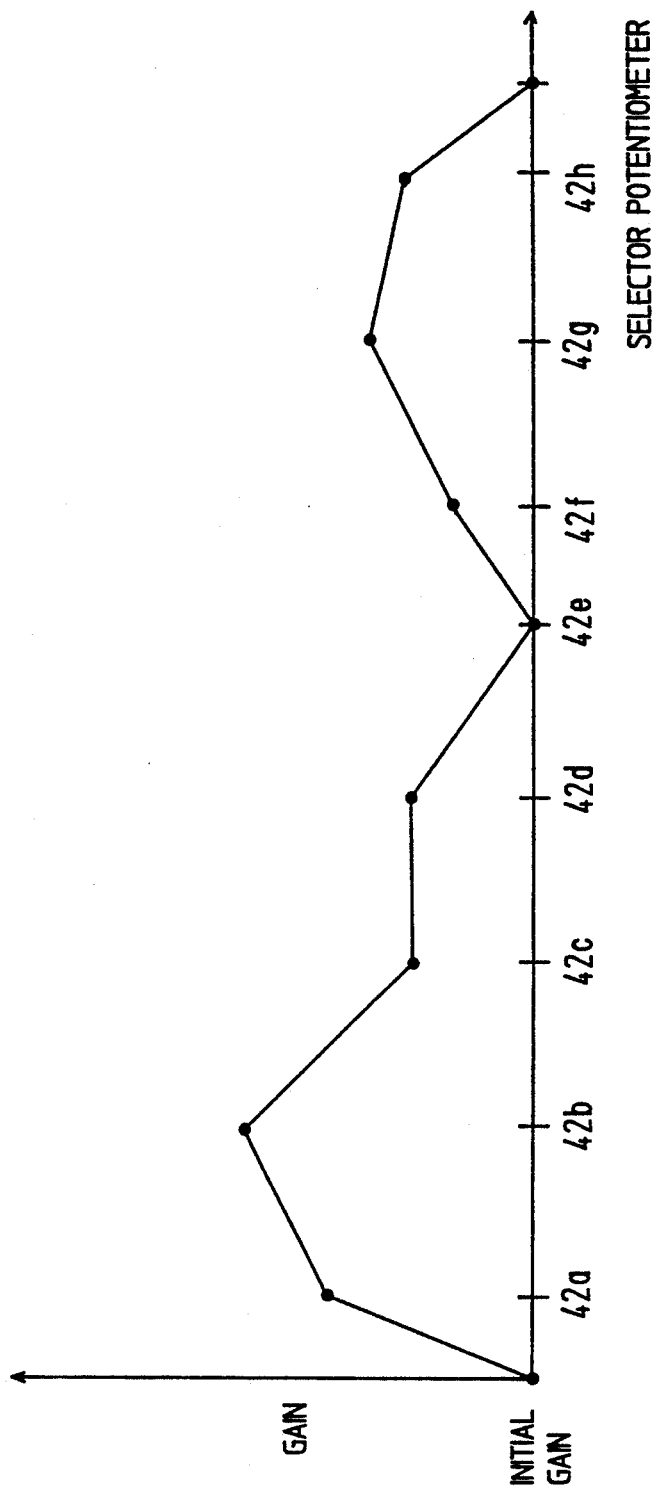
FIG. 3 is a graphical representation of gain smoothing used in the preferred embodiment.

FIG. 3 illustrates a gain smoothing algorithm used in the preferred embodiment. It is possible to implement the present invention such that the LGC gain function is constant across a subsector such as 10. However, this may result in an undesired gain discontinuity between adjacent subsectors. To avoid this discontinuity, processor 52 performs a gain smoothing function, which in the preferred embodiment was chosen to be a linear interpolation of gains corresponding to the settings of potentiometers 42a-42n (where n=8).

A scan line at or near the center of a subsector such as 10 would have an associated gain corresponding exactly to the operator selected potentiometer setting, and the gains for scan lines located between center scan lines of adjacent subsectors would be modified in a linear manner through interpolation.

Figure 4:
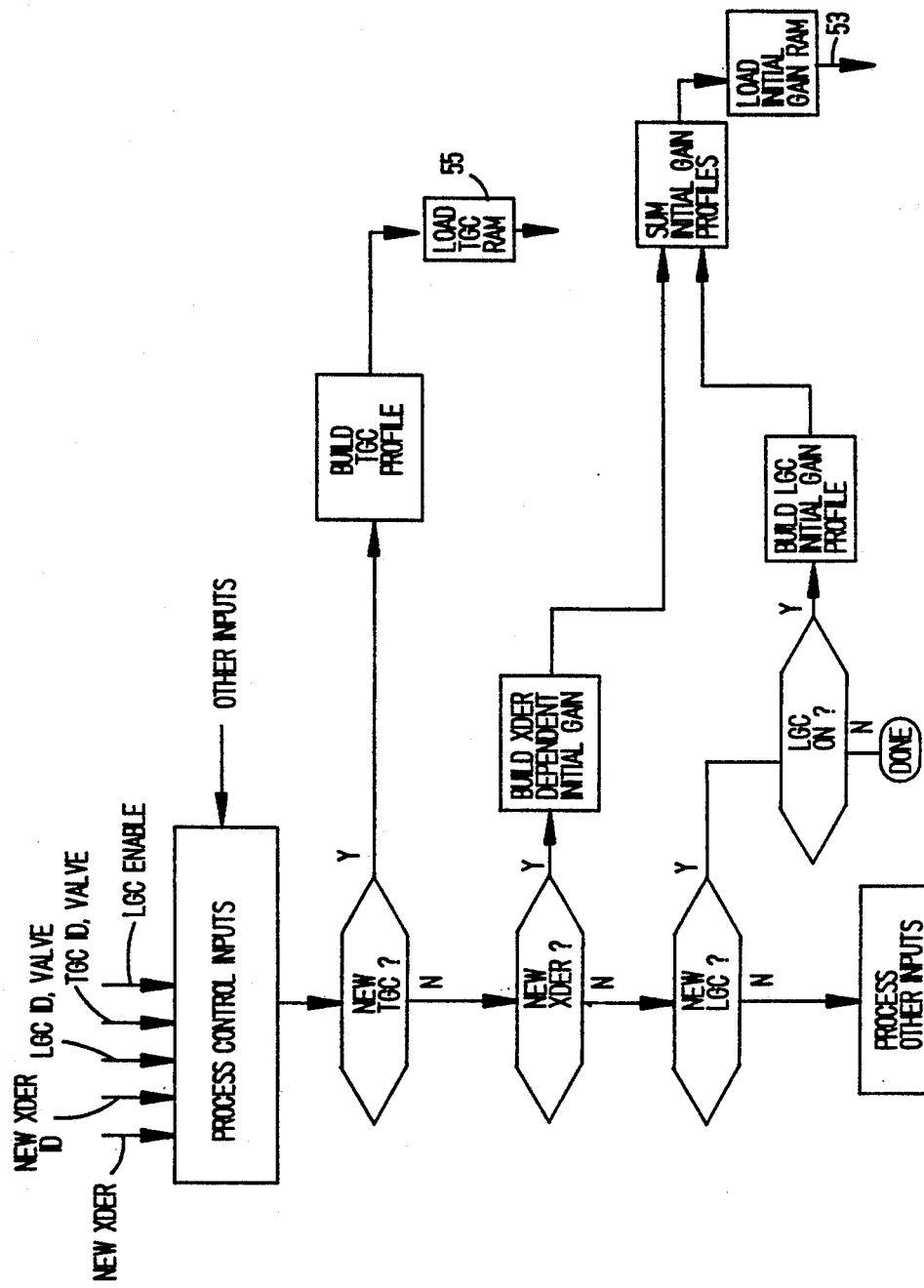
FIG. 4 is a programming flow chart for the processor used in the preferred embodiment.

FIG. 4 is a flow chart representing the programming process for processor 52 in implementing the preferred embodiment. Assume that the system represented by FIG. 4 is in a steady state condition. If the "LGC,ID VALUE" or input is changed, and the "LGC ENABLE" command is present, a new gain profile is generated by the "BUILD LGC INITIAL GAIN PROFILE" function. This gain profile is summed with Transducer compensation data, which is generated by the "BUILD XDCR DEPENDENT INITIAL GAIN" function, and/read into RAM 54 via control line 53. In a similar manner, changes to the transducer type or frequency, or to the TGC gain controls result in new data being supplied to RAMS 54 and 56 respectively.

In the preferred embodiment, the implementation of the invention was described through the variation of the gain of the received signal in arbitrarily selected subsectors of the display screen, each subsector containing a plurality of scan lines. In addition, use was made of existing system components to implement the invention. The LGC function was processed with other gain control signals (Transducer compensation, TGC) by Processor 52. One of ordinary skill would appreciate that this invention could have been implemented by such alternative techniques as varying the transmitted power in a manner similar to the LGC function, which can be selected by the operator, or by varying gain on a line to line, instead of a subsector by subsector basis, or through the use of dedicated circuitry which is not used to process other gain control signals. In addition, techniques described herein for a sector scanning system are also applicable to systems using a linear scanning format. These and other variations may be apparent to those familiar with this art, within the scope of this invention as defined by the following claims.

We claim:

1. In an ultrasonic imaging system which sequentially transmits and receives information via a transducer along each of a plurality of scan lines all of said scan lines defining a region of scan, each of said scan lines having a predetermined displacement from a reference point, an operator adjustable gain control structure which varies the gain of said system as a function of the displacement of at least one of said scan lines comprising operator adjustment means for generating a gain control command for adjusting the gain of at least one scan line, said at least one scan line being operator selectable at any location within said region of scan; and means responsive to said gain control command for adjusting the gain of said system such that the gain associated with a particular scan line as a result of the value of said gain control command is substantially constant as a function of distance from said transducer as measured along said particular scan line, and different from the gain associated with at least one other scan line.

2. The combination set forth in claim 1 wherein said means for adjusting gain comprises a variable gain amplifier.

3. A gain control system for use with an ultrasonic imaging system, said system including transmitter, receiver, transducer, and display means, which sequentially transmits and receives information along a plurality of scan lines all of said scan lines defining a region of scan, each of said scan lines having a predetermined displacement from a reference point comprising operator selected means for generating a plurality of gain control commands, each of said commands corresponding to the gain associated with at least one respective scan line said at least one scan line being operator selectable at any location within the region of scan; and means responsive to said commands for adjusting the gain of said system such that the gain associated with each of said respective scan lines as a result of the value of each of said gain control commands is substantially constant as a function of the distance from said transducer as measured along said respective scan line and different from the gain associated with at least one other scan line.

4. In an ultrasound imaging system which includes transducer, transmitter, receiver and display means, which sequentially transmits and receives information along each of a plurality of scan lines in predetermined scan format, all of said scan lines defining a region of scan, each of said scan lines being a unique distance from a reference point, and further includes at least means for generating a plurality of first gain control commands, and operator adjustable gain control system comprising operator selected means for generating a plurality of second gain control commands, each of said second gain control commands controlling the gain of at least one of a corresponding plurality of scan lines at any location within said region of scan such that the gain of each scan line due to said second gain control command is constant as a function of distance from said transducer along each of scan lines and different from the gain associated with at least one other scan line;

means for combining said plurality of first gain control commands and said plurality of second gain control commands into a plurality of third gain control commands; and means responsive to said third gain control commands for adjusting the gain of said system.

5. The combination set forth in claim 4 wherein said means for adjusting gain comprises a variable gain amplifier.

6. The combination set forth in claim 4 wherein said means for generating a plurality of first gain control commands is a TGC generator.

7. In an ultrasound imaging system which includes a transmitter, receiver and display, which sequentially transmits and receives information through a transducer along each of a plurality if scan lines in a predetermined scan format all of said scan lines defining a region of scan, each of said scan lines being a unique distance from a reference point, an operator adjustable gain control structure for controlling the gain of a given sector of said scan format, each sector containing a plurality of scan lines, comprising operator adjustable structure for generating a plurality of gain control commands at any location within said region of scan, each gain control command representing a constant gain for a given scan line as a function of its distance from said transducer within a given sector and different from the gain associated with at least one other scan line a variable gain amplifier responsive to at least said plurality of gain control commands.

8. The combination set forth in claim 7 wherein said operator adjustable structure comprises a plurality of potentiometers, each potentiometer generating a discrete gain control command.

9. The combination set forth in claim 7 further including means responsive to said gain control commands for varying the gain of each scan line within a given sector such that the gain of a scan line at or near the center of a given sector is greater than the gain of a scan line at or near each end of that sector, the gain of any given scan line being constant as a function of its distance from said transducer.

* * * * *